United States Patent
Iinuma

(10) Patent No.: US 7,167,512 B2
(45) Date of Patent: Jan. 23, 2007

(54) COMMUNICATION METHOD, COMMUNICATION APPARATUS, SOFTWARE PROGRAM AND COMPUTER-READABLE RECORDING MEDIUM FOR AVOIDING DELAY IN AUTHENTICATION DUE TO INTERRUPTION OF COMMUNICATION

(75) Inventor: Nobuharu Iinuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 662 days.

(21) Appl. No.: 10/281,950

(22) Filed: Oct. 29, 2002

(65) Prior Publication Data

US 2003/0193999 A1 Oct. 16, 2003

(30) Foreign Application Priority Data

Mar. 27, 2002 (JP) .............................. 2002-089534

(51) Int. Cl.
    *H04B 1/38* (2006.01)
    *G06F 15/16* (2006.01)
    *H04L 9/32* (2006.01)

(52) U.S. Cl. ........................... 375/222; 709/228; 726/4

(58) Field of Classification Search ............. 348/211.3; 370/355, 432; 270/477; 455/421; 375/222, 375/377, 224; 379/22.08, 93.02, 392.01, 379/93.32; 726/2, 3, 4; 709/228; 340/5.1, 340/5.2, 5.8, 5.28, 5.31

See application file for complete search history.

(56) References Cited

U.S. PATENT DOCUMENTS 5,317,311 A * 5/1994 Martell et al. .............. 340/905
5,969,629 A * 10/1999 Tsuchida ..................... 340/2.7
5,991,337 A * 11/1999 Giles ........................... 375/222
6,195,554 B1 * 2/2001 H'mimy et al. ............. 455/450
6,484,027 B1 * 11/2002 Mauney et al. ............. 455/421
6,510,162 B1 * 1/2003 Fijolek et al. .............. 370/432
6,515,575 B1 * 2/2003 Kataoka ..................... 340/5.8
6,930,709 B1 * 8/2005 Creamer et al. ......... 348/211.3
2002/0059369 A1* 5/2002 Kern et al. ................ 709/203
2002/0135466 A1* 9/2002 Bunyan ..................... 340/426
2002/0178236 A1* 11/2002 Patel et al. ................ 709/218
2002/0199003 A1* 12/2002 Sacca ........................ 709/228
2003/0048807 A1* 3/2003 Quiring et al. ............. 370/477
2003/0053449 A1* 3/2003 Owens et al. .............. 370/355
2003/0145219 A1* 7/2003 Cossel et al. ............... 713/200

FOREIGN PATENT DOCUMENTS

JP  9-116466  5/1997

* cited by examiner

*Primary Examiner*—Tesfaldet Bocure
*Assistant Examiner*—Vineeta Panwalkar
(74) *Attorney, Agent, or Firm*—Staas & Halsey LLP

(57) ABSTRACT

A communication method for enjoying service from a service providing system that provides predetermined service to a user after user authentication via a communication line and disconnects the communication line when the user authentication is not completed within a predetermined time is provided. The communication method includes the steps of: (a) activating operations of monitoring a communication state of the communication line and re-setting a communication parameter relating to communication when the communication state is degraded; and (b) suspending, during a predetermined time after the communication line is connected, at least one of the operations of monitoring the communication state and re-setting the communication parameter relating to the communication when the communication state is degraded.

13 Claims, 13 Drawing Sheets

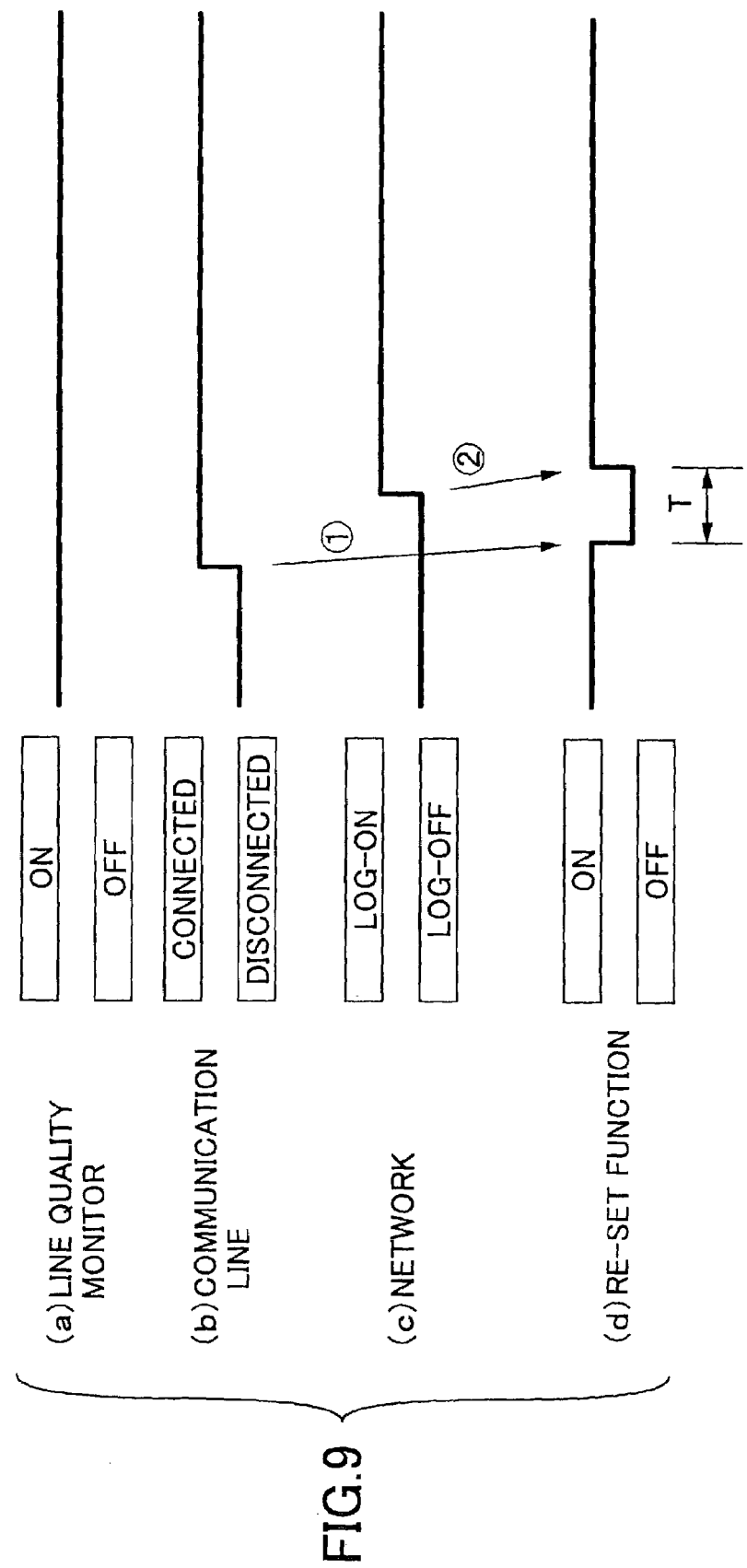

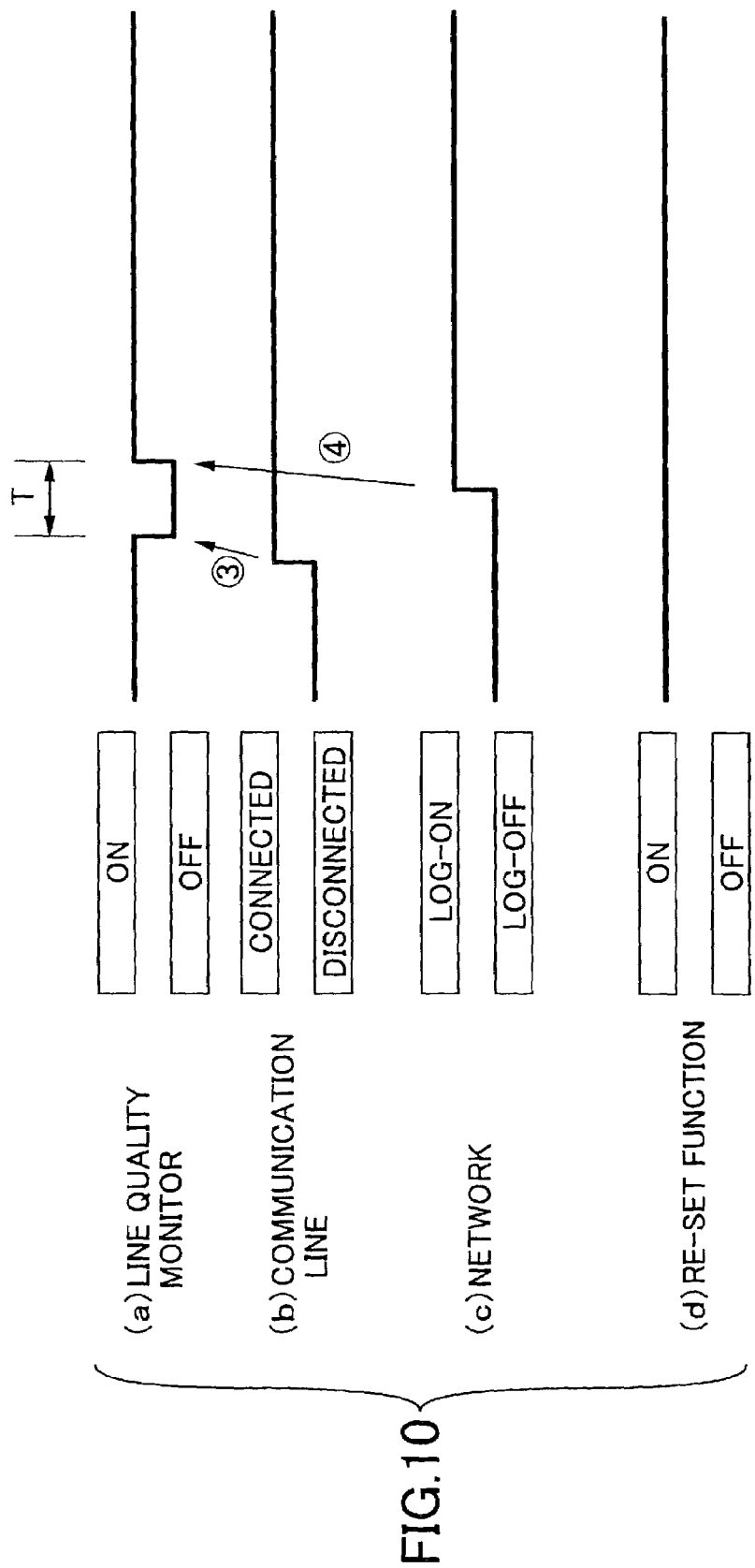

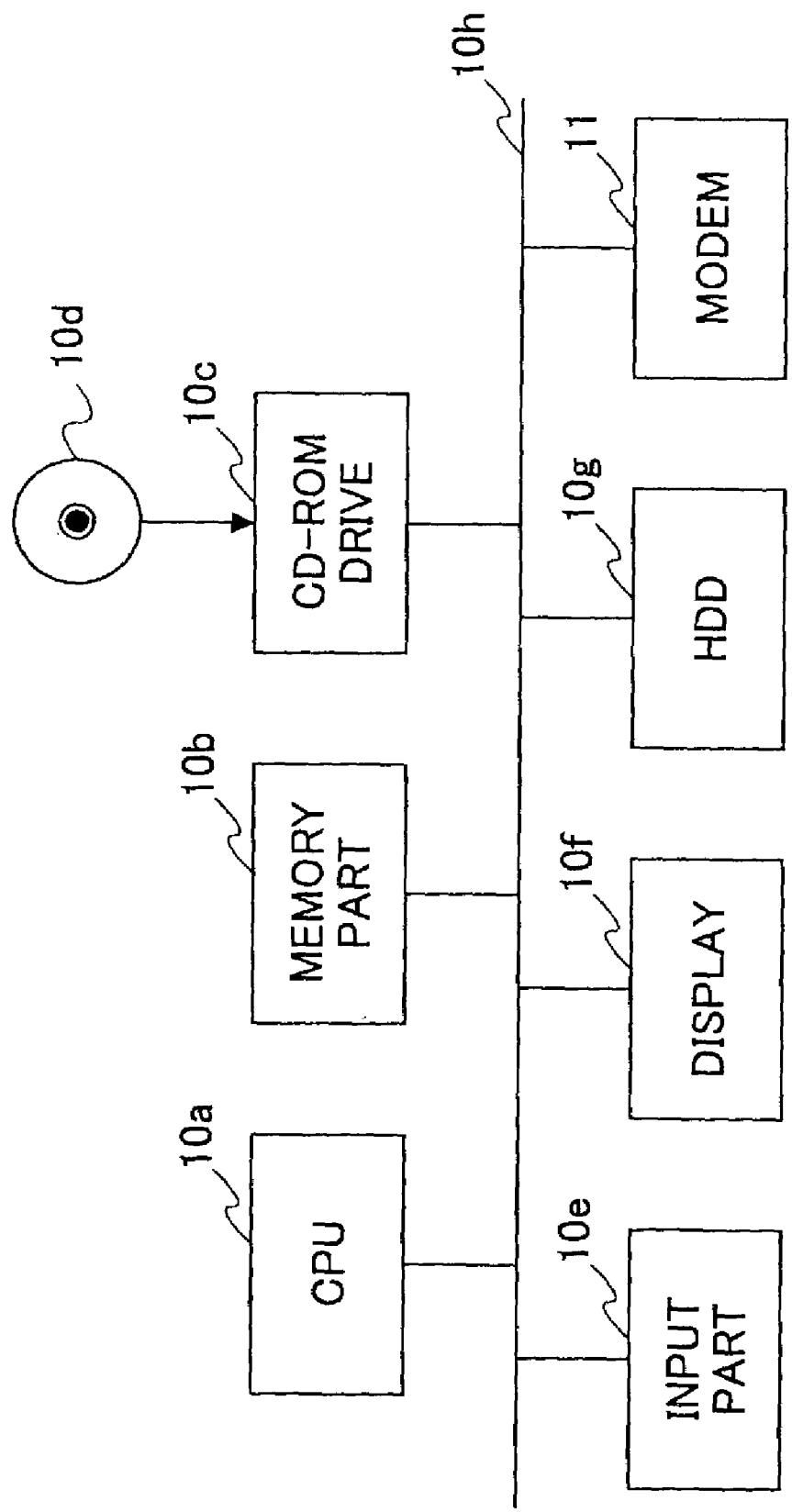

COMMUNICATION METHOD, COMMUNICATION APPARATUS, SOFTWARE PROGRAM AND COMPUTER-READABLE RECORDING MEDIUM FOR AVOIDING DELAY IN AUTHENTICATION DUE TO INTERRUPTION OF COMMUNICATION

BACKGROUND OF THE INVENTION

1. Field of the Invention

The present invention relates to communication methods, communication apparatuses, software programs and computer-readable recording media, and more particularly to a communication method and communication apparatus that monitor line quality during communication and re-set communication parameters such as a communication rate and a modulation method according to need so as to ensure a stable communication state, and to a software program for causing a computer to carry out such communication, and to a computer-readable recording medium that stores such a software program.

2. Description of the Related Art

FIG. 1 shows a state where a terminal unit 10 on a user's side such as a personal computer is connected to a server 20 at an access point of an Internet service provider or the like via a communication line 30 such as a telephone line. The terminal unit 10 connectable to the communication line 30 as mentioned above is provided with a communication device that establishes connection to the communication line 30, that is, a modem 11. In order to ensure the stable communication state, the modem has functions of constantly monitoring the communication state and re-setting (, newly setting or updating) various communication parameters if necessary, such as a speed of circuit, communication protocol, error correction method and data compression method.

According to the functions, normal communication is temporarily suspended and a communication parameter re-set operation (hereinafter referred to as a "re-set operation") as described above is activated when, as a result of a monitoring operation as mentioned above, it is detected that an input signal level, a S/N ratio (signal-to-noise ratio) and the like drop to equal to or less than predetermined levels due to noise or the like on the communication line 30. In other words, the operation of sequentially re-setting (, newly setting or updating) the various communication parameters is performed while negotiation between the modem 11 and a modem 21 of the server 20 is performed via the communication line 30. In addition, as for noise, there are power noise, electromagnetic noise by a microwave and the like, and noise specific to an inverter of an air conditioner, for example.

FIG. 2 is a function block diagram of the modem 11. As shown in FIG. 2, the modem 11 includes a controller 11a, a modulator/demodulator 11b and a line interface part 11c. The controller 11a transmits/receives a signal to/from a personal computer (PC) 12. The line interface part 11c is connected to the communication line 30 such as a telephone line and the like. The modulator/demodulator 11b is provided between the controller 11a and the line interface part 11c. The modulator/demodulator 11b has a function of converting the signal from the personal computer 12 to a signal for communication by compression and modulation. Additionally, the modulator/demodulator 11b has a function to convert the signal for communication received at the line interface part 11c to a signal that can be used in the personal computer 12 by demodulation and decompression.

Further, generally, the functions of the controller 11a and modulator/demodulator 11b of the modem of today are realized by software, since the operation of a CPU in a computer is speeding up, for example. In this case, such software is called driver software. The driver software functions on the Operating System (OS) of a personal computer and carries out the modem functions as described above.

In the system shown in FIG. 1, the Internet service provider performs a user authentication operation (hereinafter referred to as a "authentication operation") in the beginning of the communication with a user, when providing, to the user, service according to the contract previously made with the user. In the authentication operation, the user is identified and authenticated by being prompted to input such as a user name and a user ID that are set when concluding the contract. After the identification and authentication of the user, the Internet service provider (hereinafter simply referred to as an "ISP") connects the terminal unit 10 of the user to a communication network such as the Internet. The user can enjoy various services provided via the Internet only when the connection is established by the ISP after the authentication operation.

FIG. 3 is a flow chart showing the operation in the above-described case. In step S1, a line connection operation by the modem 11 is started by a dial-up operation of application software (hereinafter simply referred to as an "application") in the personal computer 12 as the terminal unit 10 on the user's side. Then, the modem 11 transmits a line connection request to the modem 21 provided to the server 20 at the access point of the ISP. As a result, in step S2, the negotiation between the modems 11 and 21 is performed. In step S3, whether or not the negotiation succeeds is determined. When the various communication parameters are set and the negotiation ends in success (YES in step S3), the connection of the communication line 30 is completed in step S5.

When the setting of the communication parameters by the negotiation ends in failure (NO in step S3), the communication line 30 is disconnected in step S4, and the process is returned to the application again. Thereafter, steps S1 through S3 are repeated until the re-setting (, new setting or updating) of the communication parameters succeeds when the user gives a restart instruction.

When the connection of the communication line 30 is completed in step S5, the process is handled by the application on the server 20 of the ISP from step S6. In step S6, the confirmation of the ID and a password is performed as the authentication operation. In step S7, whether or not the confirmation succeeds is determined. When the confirmation succeeds (YES in step S7), the ISP connects the communication line 30 to a network in step S8. Consequently, in step S9, the user can enjoy the service via the network by Net-surfing and the like.

However, when the re-setting operation is activated during the authentication operation in step S6 due to noise or the like, the normal communication is stopped for performing the negotiation between the modems 11 and 21. Accordingly, the authentication operation is aborted. As a result, the decision result in step S7 is NO, and the process returns to the application on the user's side. When the user gives an instruction of restarting the connection with the communication line 30, the communication line connection operation starting from step S1 is started.

FIGS. 4 and 5 show the operation flow that organizes the above-described operation and further includes the function of a authentication timer. First, FIG. 4 shows a case where the authentication succeeds without being aborted by the disconnection of the communication line 30 due to noise and the like. In this case, after a line connection operation (step S21) and the completion of the line connection (step S22), the authentication operation (step S23) is started. At this moment, the authentication timer is activated in step S24. Then when the authentication operation is correctly carried out and ends in step S25, in step S26, the communication line 30 is connected to the network and the user can enjoy Net-surfing with the user terminal 10. In this case, the authentication timer is cleared in step S26, by the completion of the authentication operation in step S25.

Next, by referring to FIG. 5, a description will be given of a case where the authentication operation is aborted by the disconnection of the communication line 30 due to noise, and as a result, the authentication ends in failure. In this case, the operations from step S21 to step S23 are the same as those corresponding steps in FIG. 4. However, in FIG. 5, when the communication state is worsened due to noise and the like in step S31, the re-set operation is performed in step S34 so as to recover the communication state. In this case, in order to perform the negotiation between the modems 11 and 21, the normal communication is suspended in step S32. Consequently, the authentication operation cannot be continued and is aborted in step S33.

Then, as a result of the re-set operation in step S34, the re-setting of the communication parameters is completed, the communication for the authentication operation is restarted, and the authentication operation is restarted. However, in this case, since the authentication operation is aborted in step S33, due to the passage of time, there is a case where the authentication timer times out before the authentication operation succeeds (step S35). In this case, the authentication operation ends in failure ("failure in authentication"), and in step S36, the application on the server 20's side disconnects the communication line 30 via the modem 21. Thus, it is necessary for the user to reattempt from step S21, that is, the connection operation of the communication line 30.

For example, in a case where, since the state of the communication line 30 is wrong, due to noise and the like (step S31), the "failure in authentication" because of the time out of the authentication timer (step S35) and the disconnection of the communication line 30 (step S36) caused by the "failure in authentication" is repeated more than once, the user cannot, for an indefinite period, enjoy the service via the network which service is a desired object.

Next, referring to FIG. 6, a more detailed description will be given of the cause of the above-described situation. As shown in FIG. 6, when the line connection is completed in step S41 (corresponding to step S5 in FIG. 3, or in step S22 in FIGS. 4 and 5), in step S42, the modem 11 on the user's side starts data transmission/reception with the modem 21 of the server 20 to which modem the communication line 30 is connected in step S41. Accordingly, in step S61, the application of the server 20 transmits a request for the ID and password as the authentication operation. In response, in step S62, the application on the user's side transmits the ID and password according to the input by the user.

On the other hand, while the communication line 30 is connected (step S43), when the communication state is temporarily degraded due to noise or the like in step S44, if a communication line monitor function is ON (YES in step S45), the modem 11 detects the communication state. Further, if a re-set function is activated and effective (YES in step S46), in step S47, the modem 11 suspends the general communication (data transmission/reception) for the re-set operation. It should be noted that, in step S45, it is determined whether or not the communication line monitor function is ON. In addition, whether or not the re-set function is ON is determined in step S46. Consequently, the authentication operation cannot be continued. Then, in step S48, the modem 11 performs the re-set operation of the communication parameters. As a result, the data transmission/reception is restarted in step S49, and the communication line 30 assumes a connected state in step S50. Accordingly, the authentication operation is restarted. When the authentication succeeds (YES in step S64), the communication line 30 is connected to the network. However, when the authentication timer times out due to the delay in confirmation of the ID and password (step S63) by the suspension of the authentication operation, the authentication ends in failure (NO in step S64), and the communication line 30 itself is disconnected by the modem 21 of the ISP in step S66.

SUMMARY OF THE INVENTION

It is a general object of the present invention to provide an improved and useful communication method, communication apparatus, software program and computer-readable recording medium by which the above-described problems are solved.

It is a more specific object of the present invention to provide a communication method and communication apparatus that can achieve in a timely manner the desired object of the user without the delay of the authentication operation even when, during the authentication operation, the communication state is temporarily degraded due to the noise or the like, and to provide a software program for causing the computer to carry out such communication, and to provide a computer-readable recording medium that stores such a software program.

In order to achieve the above-described objects, according to one aspect of the present invention, there is provided a communication method for enjoying service from a service providing system that provides predetermined service to a user after user authentication via a communication line and disconnects the communication line when the user authentication is not completed within a predetermined time, the communication method including the steps of: (a) activating operations of monitoring a communication state of the communication line and re-setting a communication parameter relating to communication when the communication state is degraded; and (b) suspending, during a predetermined time after the communication line is connected, at least one of the operations of monitoring the communication state and re-setting the communication parameter relating to the communication when the communication state is degraded.

Also, according to another aspect of the present invention, there is provided a communication apparatus for enjoying service from a service providing system that provides predetermined service to a user after user authentication via a communication line and disconnects the communication line when the user authentication is not completed within a predetermined time, the communication apparatus including: a monitor that monitors a communication state of the communication line; an activating part that activates an operation of re-setting a communication parameter relating to communication when the communication state is degraded; and a suspending part that suspends, during a predetermined time after the communication line is connected, at least one of functions of the monitor and the activating part.

In addition, according to another aspect of the present invention, there is provided a software program for causing a computer to carry out a process for enjoying service from a service providing system that provides predetermined service to a user after user authentication via a communication line and disconnects the communication line when the user authentication is not completed within a predetermined time, the software program including the instructions of: (a) causing the computer to monitor a communication state of the communication line; (b) causing the computer to activate an operation of re-setting a communication parameter relating to communication when the communication state is degraded; and (c) causing the computer to suspend, during a predetermined time after the communication line is connected, at least one of monitoring the communication state of the communication line and activating the operation of re-setting the communication parameter relating to the communication when the communication state is degraded.

Further, according to another aspect of the present invention, there is provided a computer-readable recording medium that stores the above-described software program.

According to the present invention, having the authentication operation end in failure due to the suspension of communication (data communication) during the authentication operation is avoided. Thus, the authentication operation is performed smoothly. Therefore, it is possible for the user to promptly enjoy the service provided via the network which service is the desired object.

Other objects, features and advantages of the present invention will become more apparent from the following detailed description when read in conjunction with the following drawings.

BRIEF DESCRIPTION OF THE DRAWINGS

FIG. 9 is a timing chart showing an example of the operation of the communication method according to the second embodiment of the present invention;

FIG. 10 is a timing chart showing another example of the operation of the communication method;

FIG. 12 is a block diagram showing the structure of the user terminal according to a third embodiment of the present invention.

DETAILED DESCRIPTION OF THE PREFERRED EMBODIMENTS

Figure 1:
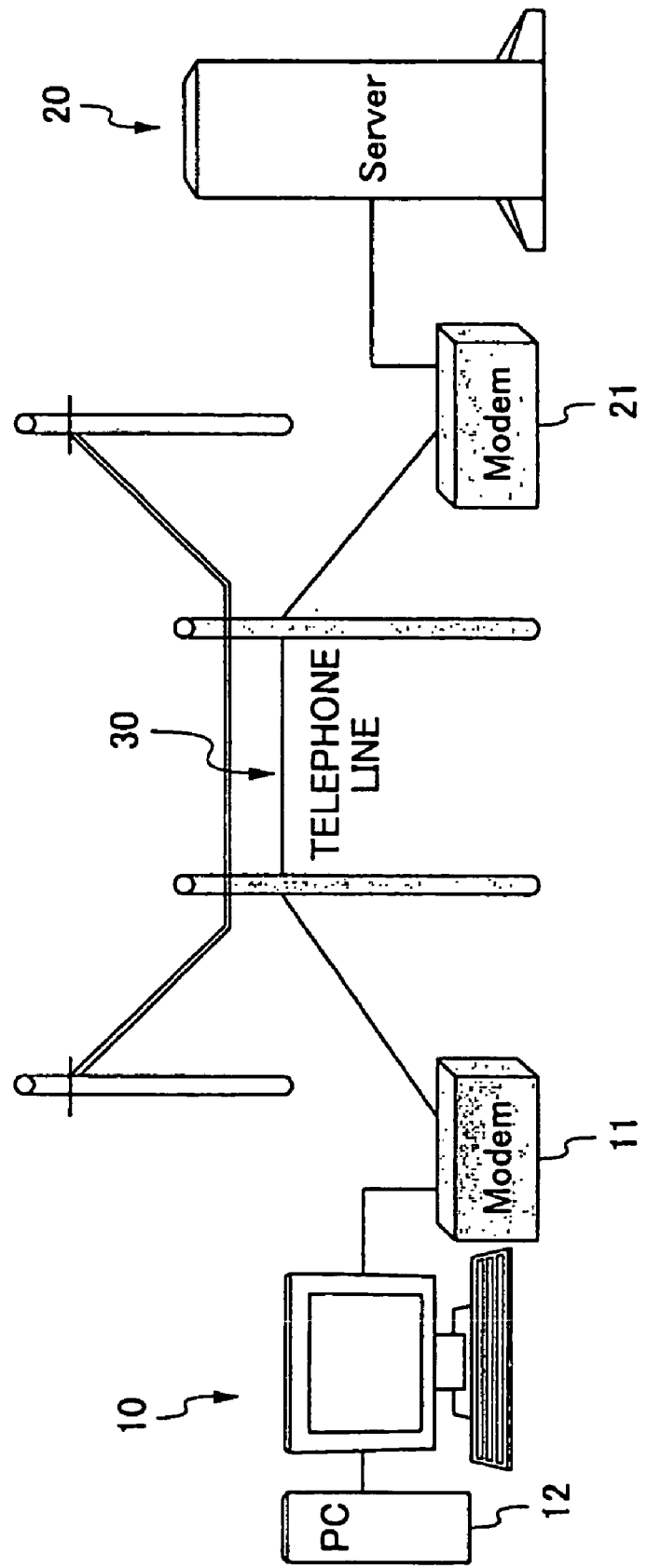
FIG. 1 is a schematic diagram for explaining a construction in which service is provided via a communication line from a system that provides the service via a network, which construction is capable of embodying the present invention.

A description will be given of embodiments of the present invention, by referring to the drawings.

First, a description will be given of a communication apparatus according to the first embodiment of the present invention.

Figure 2:
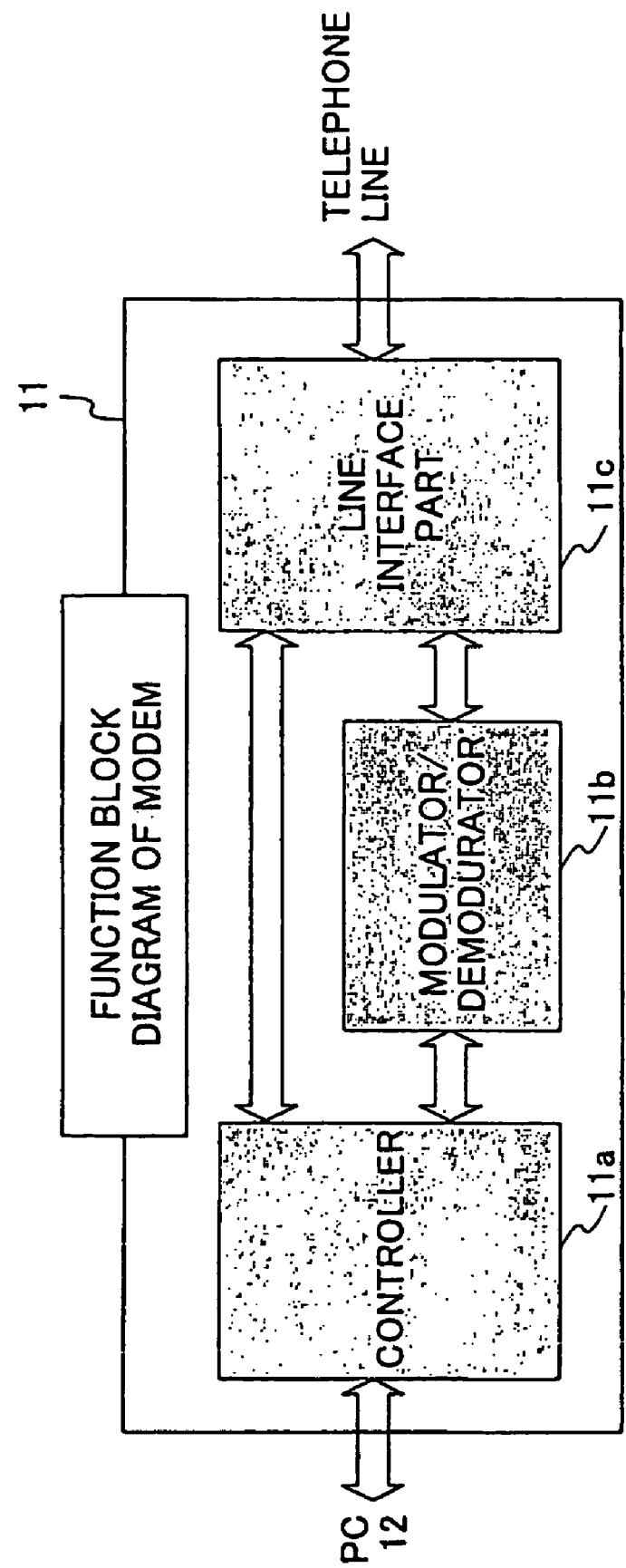
FIG. 2 is a block diagram showing an example of the construction of a modem provided in a user terminal unit shown in FIG. 1.
Figure 3:
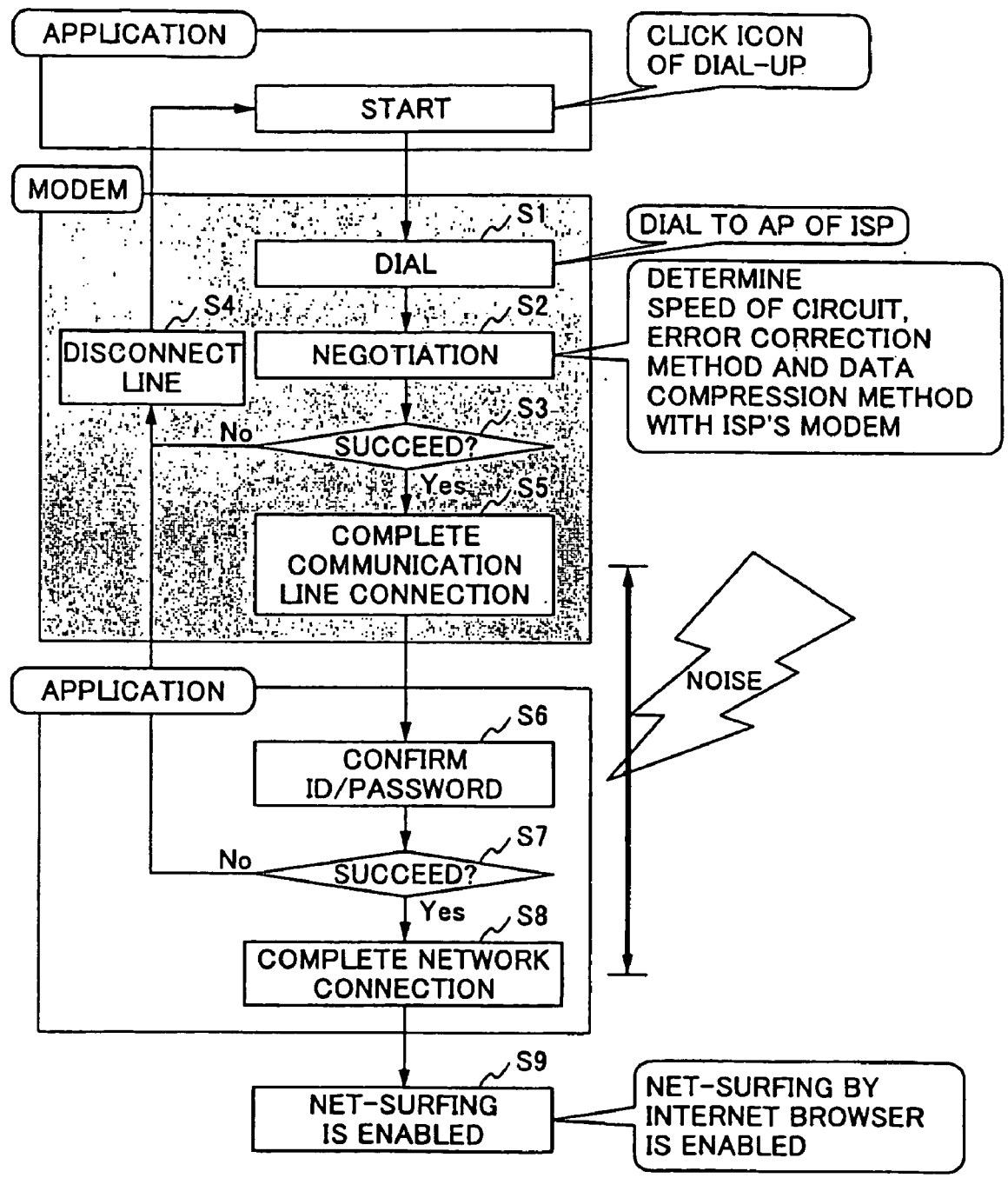
FIG. 3 is a flow chart for explaining the operation flow in which the user terminal unit is connected to a server that provides the service via the communication line, a user authentication operation is performed, and the user can enjoy the service via the network which service is a desired object.
Figure 4:
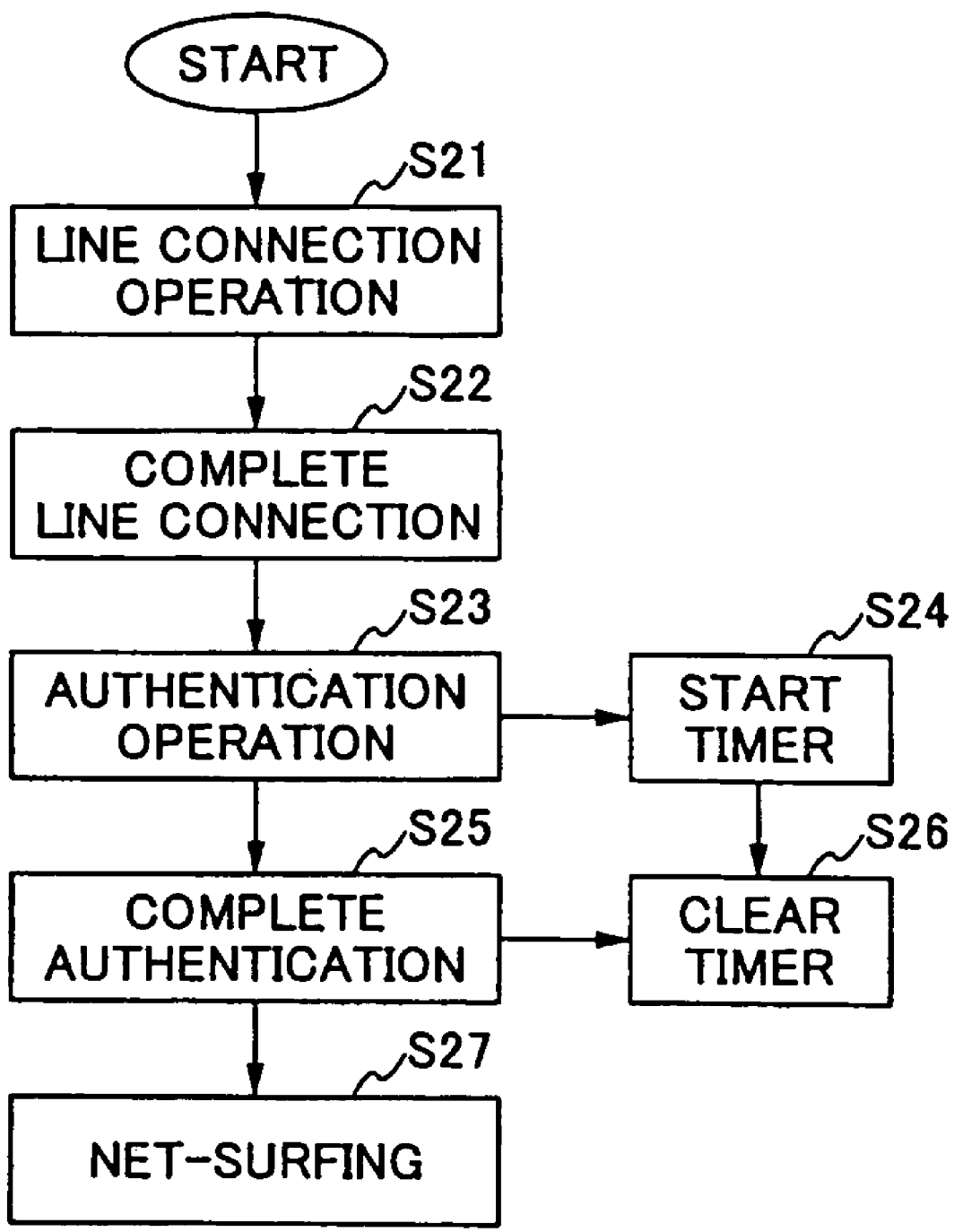
FIG. 4 is a flow chart (part 1) for arranging the operation flow in FIG. 3 and for explaining problems in prior art more specifically.
Figure 5:
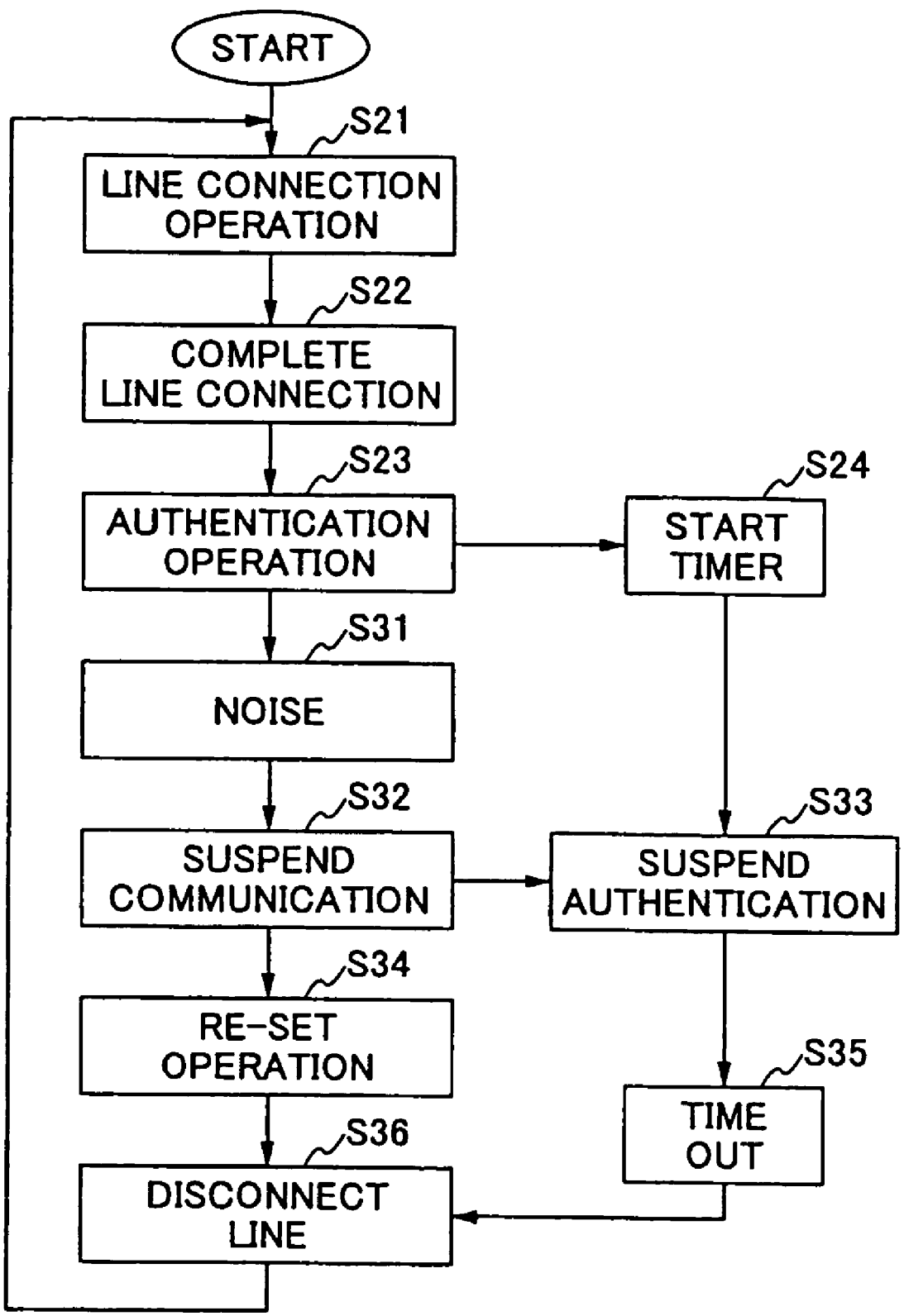
FIG. 5 is another flow chart (part 2) for arranging the operation flow in FIG. 3 and for explaining the problems in the prior art more specifically.

In a construction similar to that shown in FIGS. 1 and 2 explained in "Background of the Invention", basically, the communication apparatus according to the first embodiment of the present invention corresponds to the modem 11 of the user's side terminal unit 10 that is connected to the server 20 of the ISP via the communication line 30 and the like. Especially, the communication apparatus corresponds to the controller 11a in the modem 11.

Figure 7:
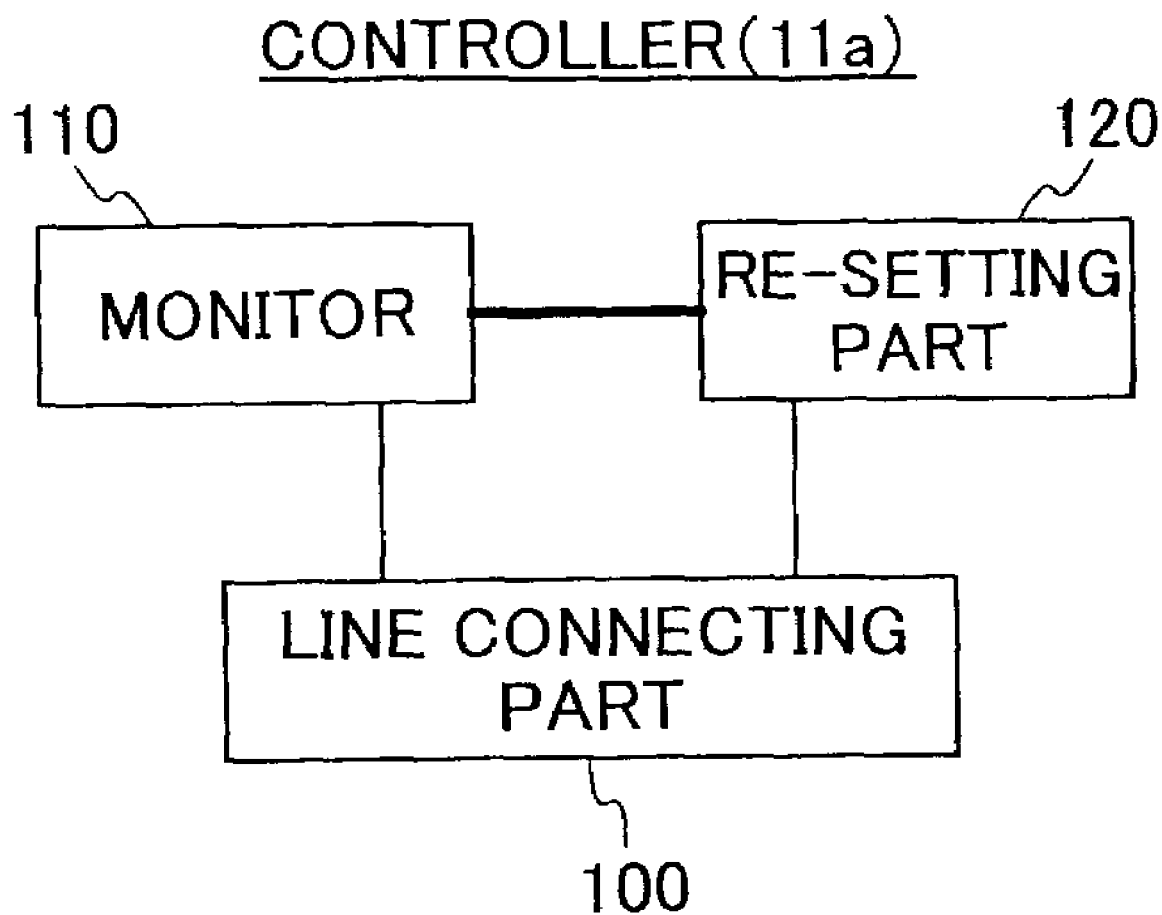
FIG. 7 is a block diagram showing the structure of a controller of the modem that serves as a communication apparatus according to a first embodiment of the present invention.

FIG. 7 shows the construction of the controller 11a of the modem 11 as the communication apparatus according to the first embodiment of the present invention. As shown in FIG. 7, the communication apparatus includes a line connecting part 100, a monitor (line quality monitor) 110, and a re-setting part 120. It should be noted that, as mentioned above, the function of the controller 11a is not only embodied in hardware, but may be embodied in a software program, that is, driver software.

The line connecting part 100 performs the line connection operation by controlling the line interface part 11c. Further, the line connecting part 100 performs a data communication process between the terminal unit 10 and the sever 20, by controlling the modulator/demodulator 11b to perform the modulation/demodulation, compression/decompression process and the like.

The monitor 110 has a function of monitoring the communication state in the communication line 30. In other words, the monitor 110 obtains, from the line interface part 11c, data relating to the communication state of the communication line 30 and analyzes the data so as to determine whether or not the communication state of the communication line 30 satisfies a predetermined level. Here, the communication state refers to a reception signal level, S/N ratio and the like. Then, when it is determined that the predetermined level is not satisfied, the monitor 110 notifies the re-setting part 120 of the determination result. The same notification is given also to the line connecting part 100. Accordingly, the line connecting part 100 suspends the data communication that is currently in execution so as to prepare for the re-set operation. In the re-set operation, the communication parameters are re-set (, newly set or updated).

When the re-setting part 120 receives, from the monitor 110, the information indicating that the communication line 30 does not satisfy the predetermined level, the re-setting part 120 gives the line connecting part 100 an instruction to perform the re-set operation of the communication parameters. According to the instruction given by the re-setting part 120, the line connecting part 100 performs the re-set operation of the various communication parameters by using the communication line 30.

In addition, the line connecting part 100 has a function of temporarily suspending the function of either the monitor 110 or the re-setting part 120 when a predetermined condition is met.

Next, a description will be given of a communication method according to the second embodiment of the present invention.

Figure 8A:
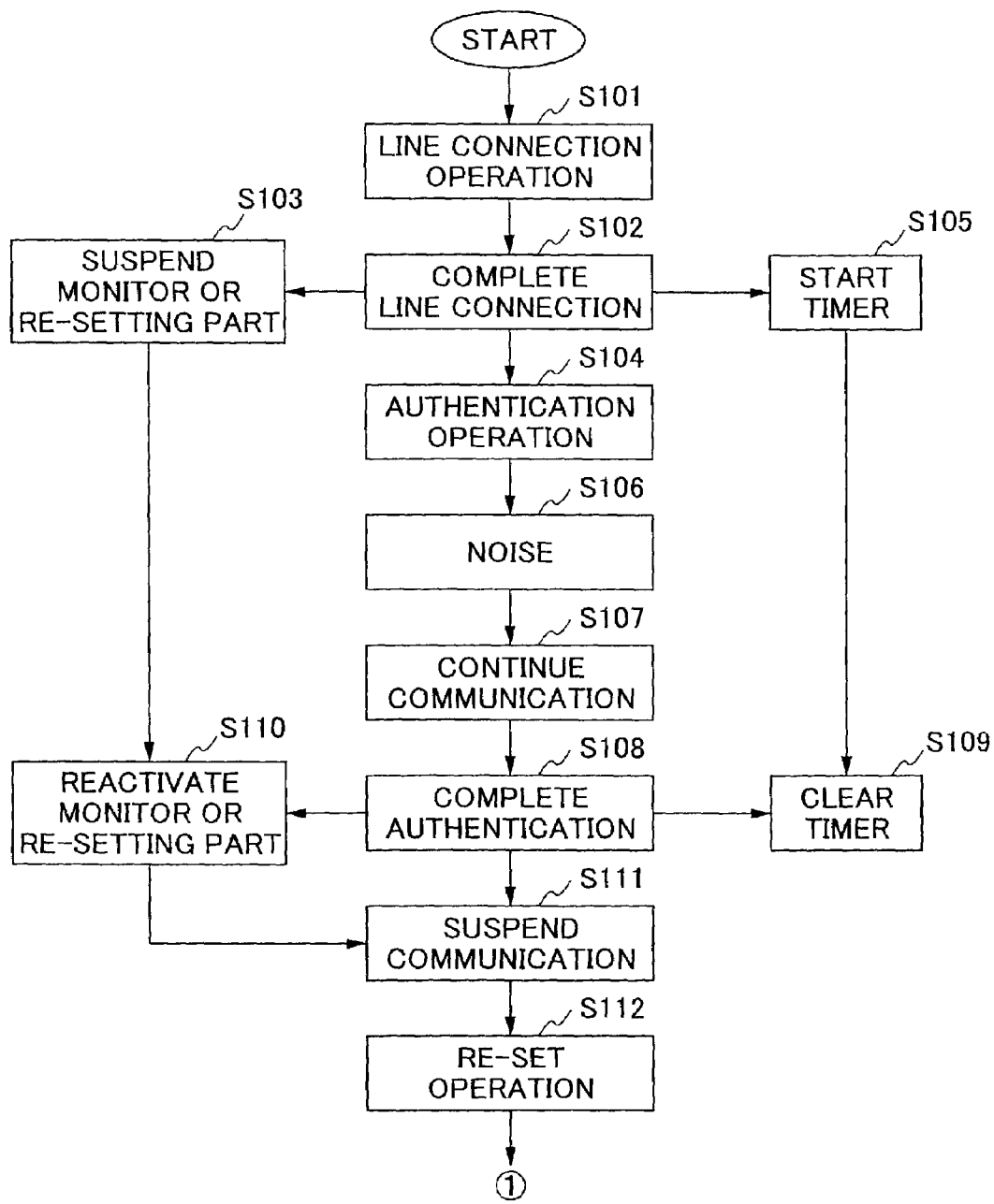
FIG. 8A is a first half of a flow chart for explaining the operation flow of a communication method according to a second embodiment of the present invention.
Figure 8B:
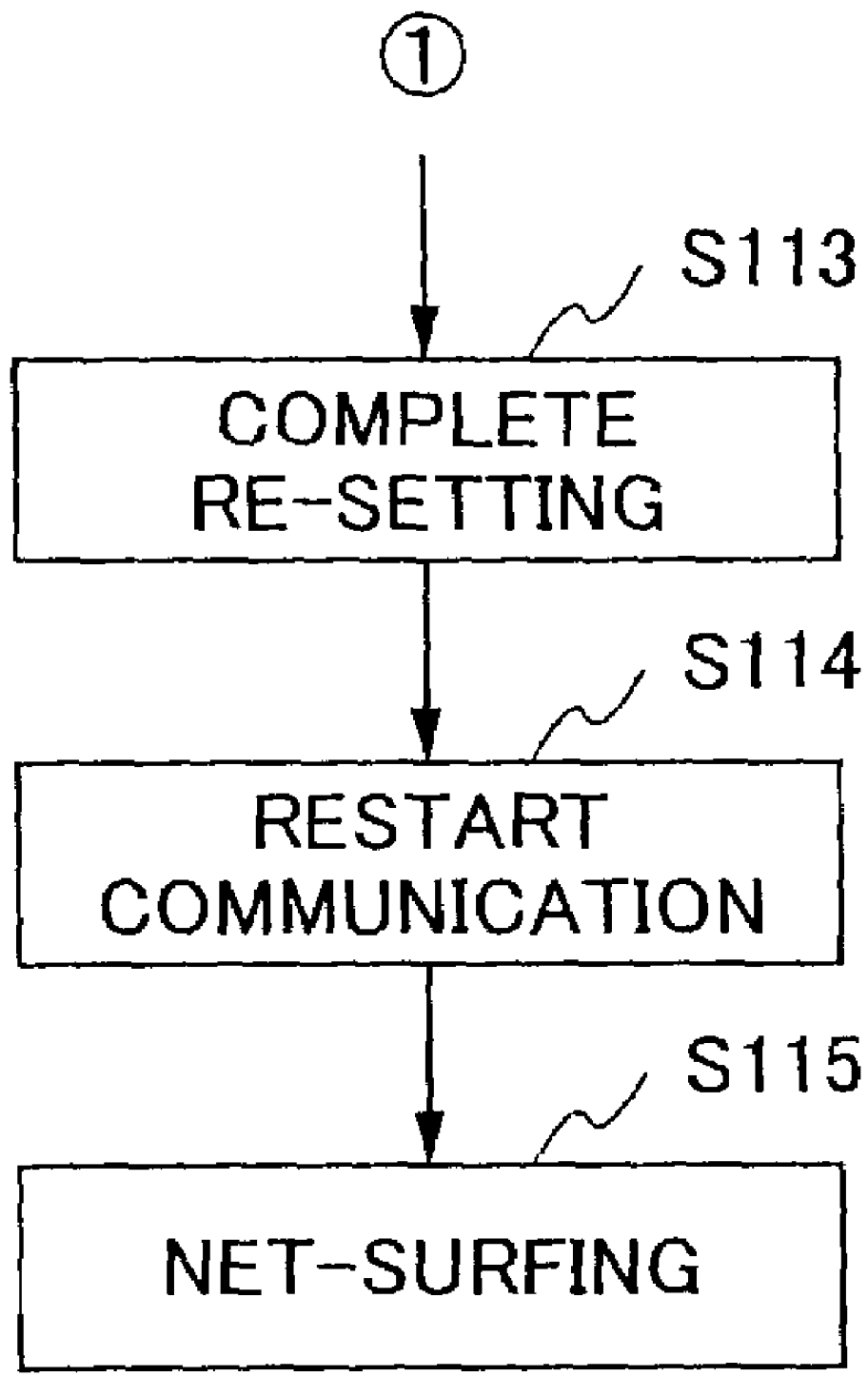
FIG. 8B is a latter half of the flow chart for explaining the operation flow of the communication method.

FIGS. 8A and 8B show a flow chart for explaining the operation of a communication method according to the second embodiment of the present invention. In FIG. 8A, the line connecting part 100 of the user's side modem 11 performs the line connection operation in step S101. Then, in step S102, the line connection is completed. At this moment, in step S103, the line connecting part 100 suspends the function of the monitor 110 or the re-setting part 120. At the same time, in step S105, the authentication timer is started. Thereafter, the authentication operation is performed by the application in step S104.

Here, a case is assumed where the communication state is degraded at this moment due to noise or the like (step S106). In this case, since the function of either the monitor 110 or the re-setting part 120 is suspended in step S103, the monitor 110 does not detect the degradation of the communication state, or the re-setting part 120 does not activate the re-set operation. Thus, since the suspension of the normal data communication following the activation of the re-set operation is not performed, the authentication operation is continued in step S107.

In this manner, even if the degradation of the communication state occurs due to noise or the like, the authentication operation is continued. Therefore, the authentication is completed in step S108. As a result, in step S110, the function of either the monitor 110 or the re-setting part 120 that is suspended in step S103 is reactivated. Then, the regular data communication is suspended in step S111. Only after step S110, the re-set operation due to the degradation of the communication state is activated in step S112. Then, by the re-set operation, when the re-setting (, newly setting or updating) is completed in step S113 in FIG. 8B, the regular data communication is restarted in step S114. In step S115, it is possible for the user to perform Net-surfing or the like that is the desired object of the user, since the user terminal 10 is already connected to the network via the communication line 30 such as a telephone line and the like by the success of the authentication.

It should be noted that even in steps S111 through S113, that is, during the suspension of the communication following the re-set operation, the established communication line is maintained. Thus, the information authenticated in step S108 is also maintained during the suspension. Therefore, when the data communication is restarted in step S114, it is not necessary to perform the authentication operation again, and it is possible to proceed to the operation of Net-surfing and the like that is the desired object.

FIGS. 9 and 10 are timing charts for explaining the operation of the communication method according to the second embodiment of the present invention. FIG. 9 is the timing chart showing a case where the function of the re-setting part 120 is suspended until the completion of the authentication after the completion of the line connection. FIG. 10 is the timing chart showing a case where the function of the monitor 110 is suspended for the same term.

In the case shown in FIG. 9, the re-set function (indicated by (d) in FIG. 9) is suspended after the connection (①) of the communication line (indicated by (b) in FIG. 9) until the log-on (②) to the network (indicated by (c) in FIG. 9). On the other hand, in the case shown in FIG. 10, the function of the monitor (line quality monitor) indicated by (a) in FIG. 10 is suspended after the connection (③) of the communication line (indicated by (b) in FIG. 10) until the log-on (④) to the network (indicated by (c) in FIG. 10).

Figure 6:
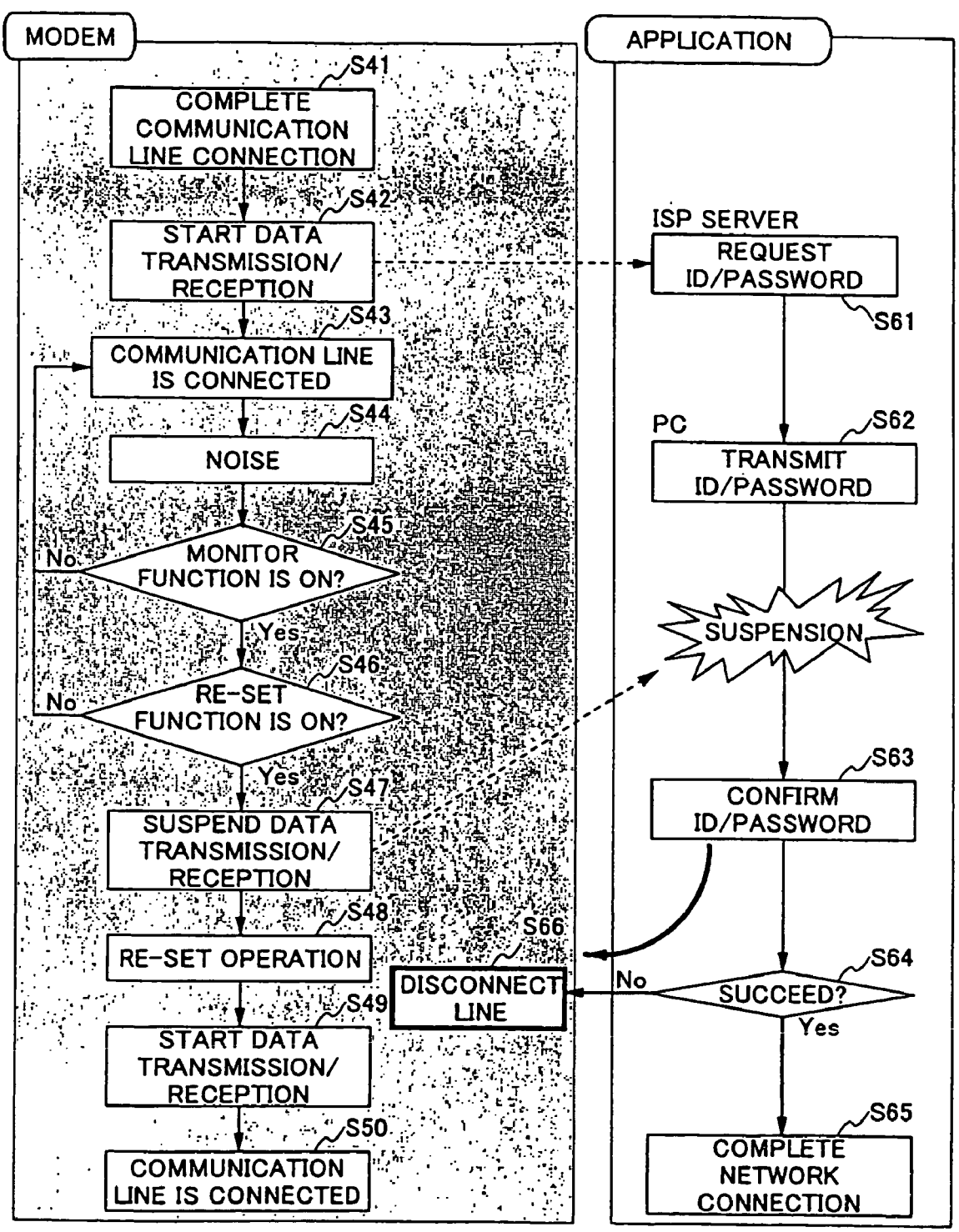
FIG. 6 is a flow chart for explaining the operations of a modem and an application in a separated manner which operations are especially associated with the present invention among the operations shown in FIGS. 3, 4 and 5.
Figure 11:
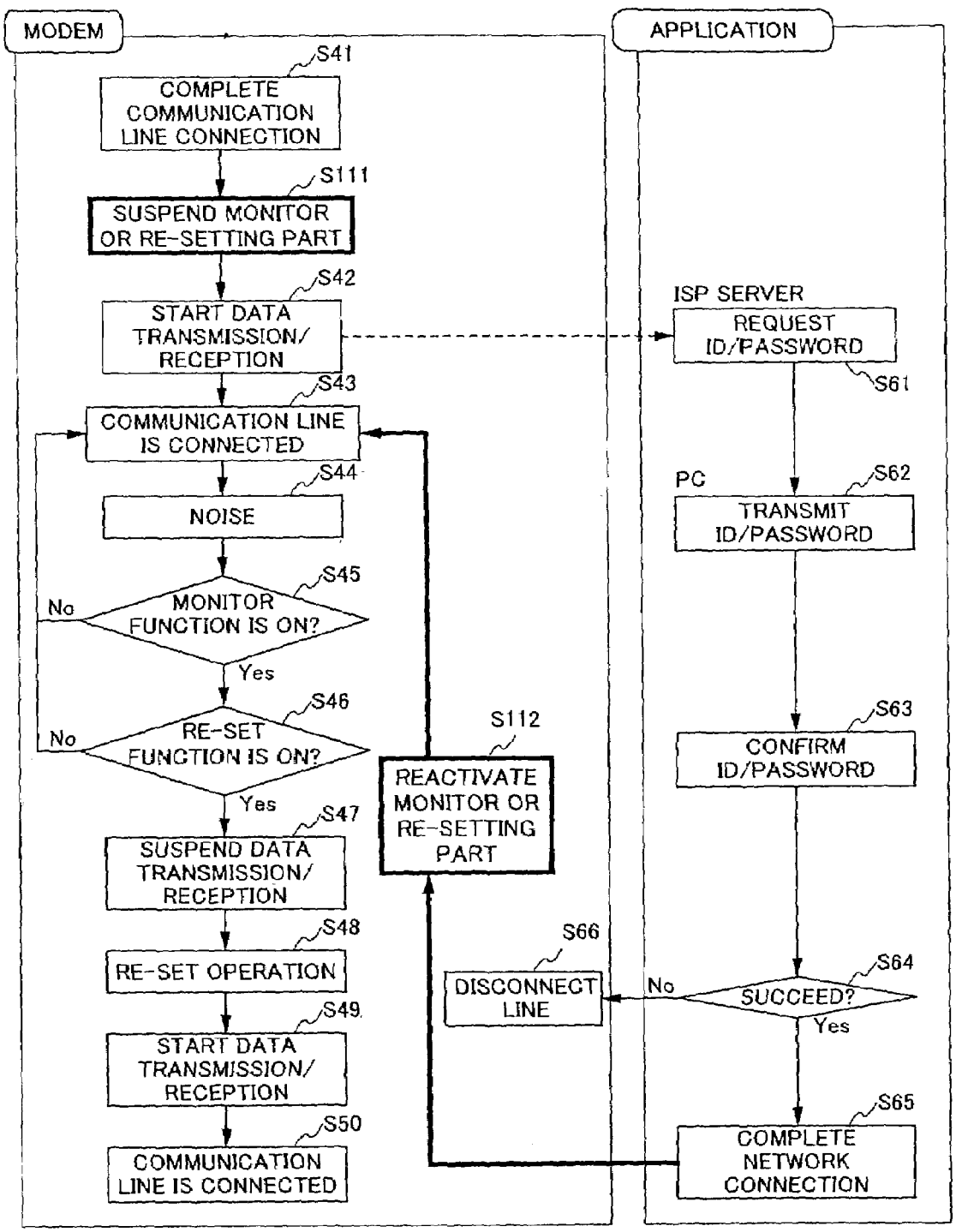
FIG. 11 is a flow chart for explaining the operations of the modem and the application in a separated manner which operations are especially characteristic of the operation in the communication method according to the second embodiment of the present invention.

FIG. 11 is a flow chart for explaining the operation according to the second embodiment of the present invention. In FIG. 11, the operations of the modems 11 and 21 and those of the applications are separately shown. It should be noted that FIG. 11 corresponds to FIG. 6, and in FIG. 11, those steps that are the same as those corresponding steps in FIG. 6 are designated by the same reference numerals.

As shown in FIG. 11, when the connection of the communication line is completed in step S41, in step S111, the function of either the monitor 110 or the re-setting part 120 is suspended. Thereafter, in step S42, the data transmission/reception is started between the user terminal 10 and the server 20 of the ISP via the communication line 30.

Hence, the application of the server 20 starts the authentication operation and requests the ID/password from the user terminal 10 in step S61. In response to the request, the user terminal 10 transmits the ID/password in step S62. The server 20 confirms the transmitted ID/password in step S63, and whether or not the authentication succeeds is determined in step S64. When the authentication succeeds (YES in step S64), the user terminal 10 is connected to the network in step S65. Accordingly, in step S112, the function of either the monitor 110 or the re-setting part 120 which function is suspended in step S111 is reactivated.

On the other hand, in the modem 11, while the communication line 30 is connected (step S43), even in a case where the degradation of the communication state occurs due to noise or the like in step S44, since the function of either the monitor 110 or the re-setting part 120 is suspended in step S111, the decision result in step S45 or S46 is NO. Thus, the process returns to step S43, and the process of steps S43 through S46 is repeated. It should be noted that whether or not the monitor 110 is activated (monitor function is ON) is determined in step S45. Additionally, in step S46, whether or not the re-setting part 120 is activated (re-setting function is ON) is determined.

After the function of either the monitor 110 or the re-setting part 120 is reactivated in step S112, both decision results in steps S45 and S46 are YES. Consequently, in step S47, the modem 11 suspends the normal data transmission/reception, and starts the re-set operation using the communication line 30 in step S48. Then, when the re-setting (, new setting or updating) of the communication parameters is completed by the re-set operation, the normal data transmission/reception that is suspended in step S47 is restarted in step S49, and the communication line 30 assumes a connected state in step S50.

Here, as mentioned above, since the normal data transmission/reception is suspended (since step S47) during the re-set operation in step S48, the service for the user using the network is suspended. However, the authentication operation is already completed (YES in step S64), and the communication line 30 used in the authentication operation remains being connected. Therefore, the authenticated information is maintained as is. As soon as the normal data transmission/reception is restarted in step S49, the user can enjoy the service via the network that is the desired object again.

Next, a description will be given of a software program and a computer-readable recording medium storing the software program according to the third embodiment of the present invention, by referring to FIG. 12.

FIG. 12 is a block diagram showing the structure of the user terminal 10. In FIG. 12, the user terminal 10 includes a CPU 10a, a memory part 10b, a CD-ROM drive 10c, an input part 10e, a display 10f, a hard disk drive (HDD) 10g and the modem 11 that are connected via a bus 10h. The memory part 10b is made of RAM, ROM and the like. The input part 10e includes a keyboard and a mouse, for example. A CD-ROM 10d may be set to the CD-ROM drive 10c.

The software program according to the third embodiment of the present invention corresponds to the software program (driver software) described with reference to FIG. 7 and so forth, and causes a computer (in this case, the user terminal 10) to carry out the functions of the communication apparatus explained in the above embodiments. Here, the software program is stored in a portable recording medium such as the CD-ROM 10d. The CD-ROM 10d may be set to the CD-ROM drive 10c. The software program may be installed from the CD-ROM 10d to the hard disk drive 10g, transferred to the memory part 10b, and then read by the CPU 10a.

The recording medium such as the CD-ROM 10d corresponds to the computer-readable recording medium according to the third embodiment of the present invention, of course. However, the computer-readable recording medium according to the present invention is not limited to the portable recording medium such as the CD-ROM 10d, but also includes various kinds of media that are accessible by a computer. For example, IC card memories, flash memories, floppy disks, optical disks including DVDs, magneto-optical disks such as MOs, and the like. In addition, it should be noted that the software program according to the present invention may be provided not only by the portable recording media as mentioned above, but also by downloading from another computer system (not shown) by using the modem, for example.

Further, in the above-described embodiments, the function of either the monitor 110 or the re-setting part 120 is suspended until the completion of the authentication operation after the connection of the communication line 30. However, the present invention is not restricted to the embodiments. For example, as indicated by T in FIGS. 9 and 10, the function of either the monitor 110 or the re-setting part 120 may be automatically reactivated by the function of a timer after a predetermined time T. In this case, by setting the time for the timer to time out a little longer than the time required for the completion of the normal authentication operation, it is possible to avoid the authentication ending in failure because the re-set operation is activated and the communication line 30 is disconnected by the time out before the completion of the authentication operation. However, when the time interval for the time out is set too long, the activation of the re-set operation delays. Consequently, another problem occurs in that the communication state remains unstable for a long time. Thus, the time interval for the time out should be set to a suitable length.

As described above, according to the present invention, by suspending the function relating to the re-set operation of the communication parameters in the authentication operation, the authentication operation is normally completed. In addition, by the completion of the authentication, the user can enjoy the desired service via the network in a timely manner. Thus, it is possible to effectively improve the service for the user.

The present invention is not limited to the specifically disclosed embodiments, and variations and modifications may be made without departing from the scope of the present invention.

The present application is based on Japanese priority application No. 2002-089534 filed on Mar. 27, 2002, the entire contents of which are hereby incorporated by reference.

What is claimed is:

1. A communication method for enjoying service from a service providing system that can provide predetermined service to a user after user authentication via a communication line but disconnects the communication line when the user authentication is not completed within a predetermined time, said communication method comprising:

activating operations of monitoring a communication state of the communication line and re-setting a communication parameter relating to communication when the communication state is degraded; and suspending, during the predetermined time after the communication line is connected, at least one of the operations of monitoring the communication state and re-setting the communication parameter relating to the communication when the communication state is degraded.

2. The communication method as claimed in claim 1, wherein the predetermined time in which at least one of the operations of monitoring the communication state and re-setting the communication parameter relating to the communication when the communication state is degraded is suspended is a time required for completing the user authentication.

3. The communication method as claimed in claim 1, wherein the communication parameter includes at least one of a modulation method and a communication rate.

4. A communication apparatus for enjoying service from a service providing system that provides predetermined service to a user after user authentication via a communication line and disconnects the communication line when the user authentication is not completed within a predetermined time, said communication apparatus comprising:

a monitor that monitors a communication state of the communication line;

an activating part that activates an operation of re-setting a communication parameter relating to communication when the communication state is degraded; and a suspending part that suspends, during the predetermined time after the communication line is connected, at least one of functions of said monitor or said activating part.

5. The communication apparatus as claimed in claim 4, wherein the predetermined time in which the suspending part suspends at least one of the functions of the monitor and the activating part is a time required for completing the user authentication.

6. The communication apparatus as claimed in claim 4, wherein the communication parameter includes at least one of a modulation method and a communication rate.

7. A software program for causing a computer to carry out a process for enjoying service from a service providing system that provides predetermined service to a user after user authentication via a communication line and disconnects the communication line when the user authentication is not completed within a predetermined time, said software program causing the computer to:

monitor a communication state of the communication line activate an operation of re-setting a communication parameter relating to communication when the communication state is degraded; and suspend, during the predetermined time after the communication line is connected, at least one of monitoring the communication state of the communication line and activating the operation of re-setting the communication parameter relating to the communication when the communication state is degraded.

8. The software program as claimed in claim 7, wherein the predetermined time in which the computer is caused to suspend at least one of monitoring the communication state of the communication line and activating the operation of re-setting the communication parameter relating to the communication when the communication state is degraded is a time required for completing the user authentication.

9. The software program as claimed in claim 7, wherein the communication parameter includes at least one of a modulation method and a communication rate.

10. A computer-readable recording medium that stores a software program for causing a computer to carry out a process for enjoying service from a service providing system that provides predetermined service to a user after user authentication via a communication line and disconnects the communication line when the user authentication is not completed within a predetermined time, said software program comprising the instructions of:

causing the computer to monitor a communication state of the communication line;

causing the computer to activate an operation of re-setting a communication parameter relating to communication when the communication state is degraded; and causing the computer to suspend, during the predetermined time after the communication line is connected, at least one of monitoring the communication state of the communication line and activating the operation of re-setting the communication parameter relating to the communication when the communication state is degraded.

11. The computer-readable recording medium as claimed in claim 10, wherein the predetermined time in which the computer is caused to suspend at least one of monitoring the communication state of the communication line and activating the operation of re-setting the communication parameter relating to the communication when the communication state is degraded is a time required for completing the user authentication.

12. The computer-readable recording medium as claimed in claim 10, wherein the communication parameter includes at least one of a modulation method and a communication rate.

13. A method for receiving service from a service providing system that can provide predetermined service to a user after user authentication via a communication line but disconnects the communication line when the user authentication is not completed within a predetermined time, said communication method comprising:

activating operations of monitoring a communication state of the communication line and re-setting a communication parameter relating to communication when the communication state is degraded; and suspending, during the user authentication, at least one of the operations of monitoring the communication state and re-setting the communication parameter relating to the communication when the communication state is degraded.

* * * * *

UNITED STATES PATENT AND TRADEMARK OFFICE
CERTIFICATE OF CORRECTION

PATENT NO. : 7,167,512 B2  Page 1 of 1
APPLICATION NO. : 10/281950
DATED : January 23, 2007
INVENTOR(S) : Nobuharu Iinuma et al.

It is certified that error appears in the above-identified patent and that said Letters Patent is hereby corrected as shown below:

Column 22, Line 3, change "line" to --line;--.

Signed and Sealed this

Twenty-second Day of May, 2007

JON W. DUDAS
*Director of the United States Patent and Trademark Office*